W. E. HOLLAND.
STORAGE BATTERY GRID.
APPLICATION FILED JULY 8, 1918.

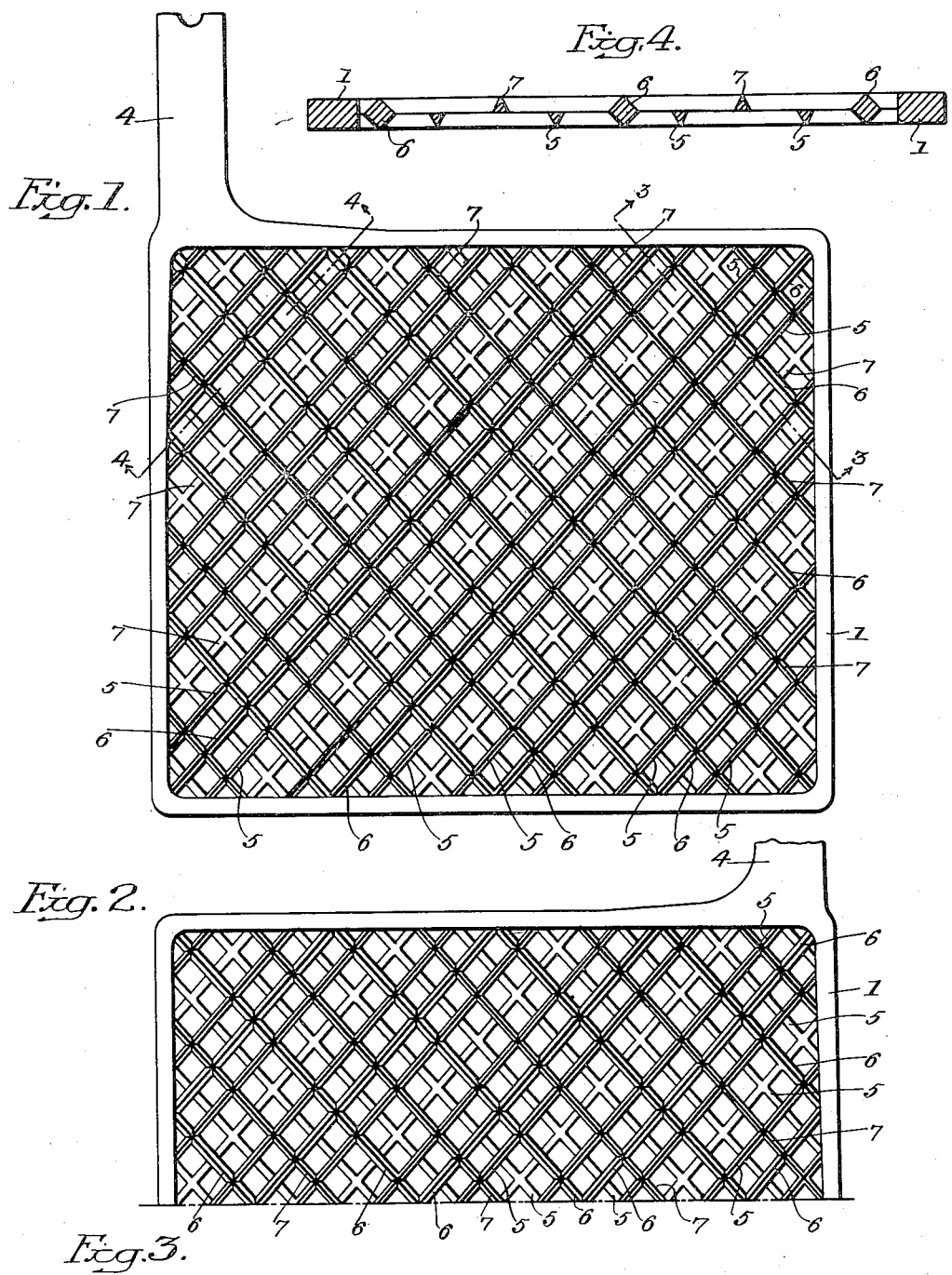

1,380,962.

Patented June 7, 1921.
2 SHEETS—SHEET 2

Inventor:
Walter E. Holland,
by his Attorneys,
Howson & Howson

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

STORAGE-BATTERY GRID.

1,380,962.

Specification of Letters Patent. Patented June 7, 1921.

Application filed July 8, 1918. Serial No. 243,748.

*To all whom it may concern:*

Be it known that I, WALTER E. HOLLAND, a citizen of the United States, residing in Philadelphia, Pennsylvania, have invented Storage-Battery Grids, of which the following is a specification.

One of the objects of this invention is to provide a storage battery grid which may be more easily cast, especially when relatively thin, than are those of the same dimensions at present in use; it being noted that the grids constructed according to the present invention may be cast at lower temperatures of both mold and molten metal than has heretofore been possible or practicable.

Another object of the invention is to provide a storage battery grid which, by virtue of being easily cast at a comparatively low temperature, may be cast and removed from the mold with more speed and at the same time will yield a higher percentage of perfect castings than is now obtainable;—the grid undergoing less shrinkage and therefore being of increased strength and durability.

A further object of the invention is to provide a storage battery grid of lighter weight and less volume than has heretofore been necessary for similar structures of the same external dimensions and which therefore shall be capable of carrying an increased amount of active material while possessing structural strength fully equal to the heavier grids formerly used both against internal expansive stresses, as well as against external stresses such as are due to vibration and shock imparted from sources external to the battery of which such grids form a part.

Figure 5:
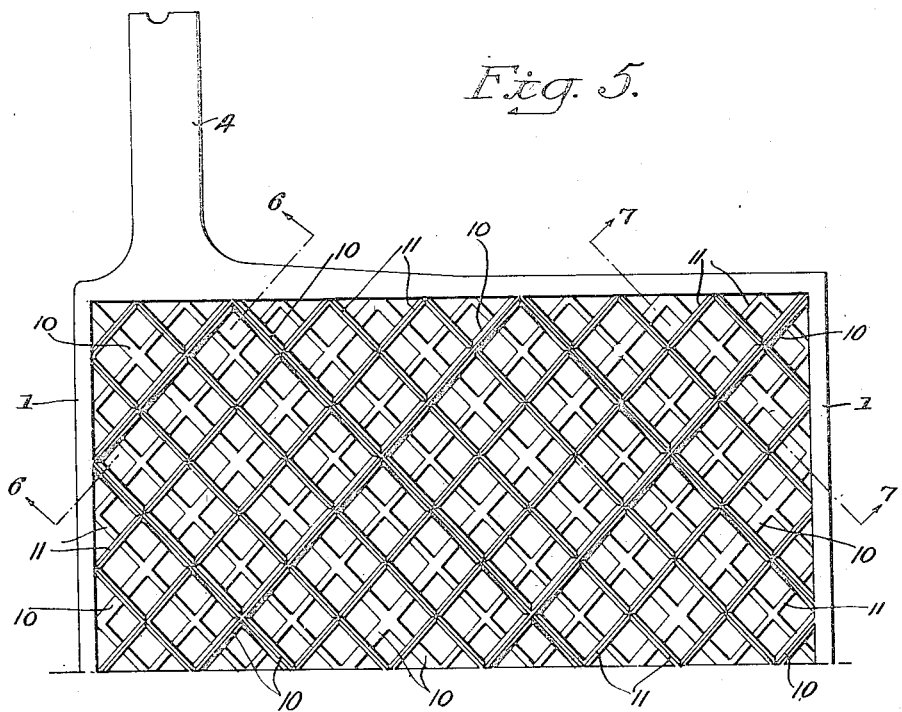
Figure 6:
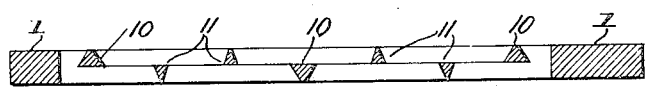
Figure 7:

These objects and other advantageous ends I attain as hereinafter set forth, reference being had to the accompanying drawings, in which, Figure 1 is an elevation of one face of a storage battery grid constructed according to my invention;

Fig. 2 is a fragmentary elevation of the other face of my grid;

Figs. 3 and 4 are enlarged transverse sections on the lines 3—3 and 4—4, Fig. 1;

Fig. 5 is a fragmentary elevation of an alternative design of grid embodying the same principle which is particularly applicable to comparatively thick plates or to plates, such as negatives, in which great strength is not required;

Figs. 6 and 7 are enlarged sections on the lines 6—6 and 7—7, Fig. 5; and

Figure 8:
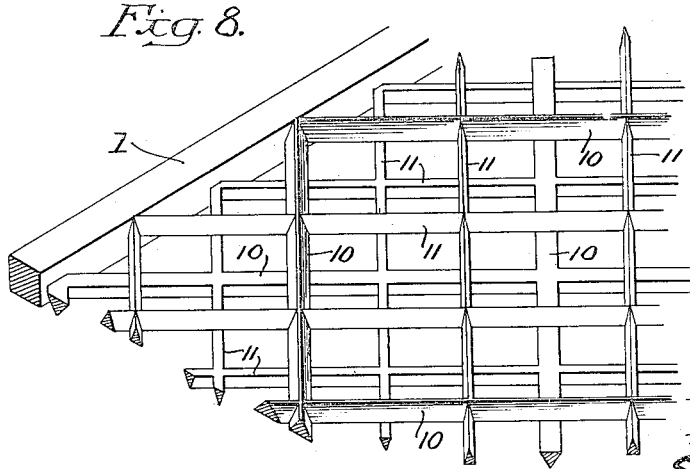

Fig. 8 is a fragmentary perspective further illustrating the construction of the grid shown in Fig. 5.

In the above drawings, 1 represents the open rectangular marginal structure forming part of the frame of a storage battery grid, having projecting from it the terminal lug 4. The sides of this marginal frame structure may be described as connected by two sets of ribs lying in or defined by two parallel planes and each including a number of rib groups 5—6—5 separated by spaces greater than the distance between their individual elements 5 and 6. The rib groups of each set are intersected by relatively light ribs 7 whose spacing is uniform and, in the case illustrated, the same as the spaces between the several rib groups. These groups 5—6—5 of each set of ribs extend at an angle to each other which is preferably though not necessarily, something other than a right angle.

The middle ribs 6 of each group are relatively heavy and in the preferred form of my invention extend completely through the grid, having practically the same depth or thickness as the marginal frame 1, so that what is the central rib of each group of one set constitutes or includes a relatively heavy group-intersecting rib of the other set. Midway between each pair of these heavy group-intersecting ribs is the single relatively light auxiliary intersecting rib 7 whose thickness like that of the auxiliary ribs 5, is but half that of the grid frame. While all of the auxiliary ribs 5 and 7 are of substantially acute triangular cross section, the relatively heavy ribs 6 are of more or less acute diamond or lozenge section. Obviously the sectional form of the ribs may be considerably modified without departing from this feature of my invention which contemplates auxiliary ribs of less cross section than the main ribs.

On account of the peculiar disposition of the heavy ribs, I have found that in casting the above described grid the molten metal will flow through all parts of the mold at lower temperatures of both mold and metal than it has hitherto been possible or practicable to employ. That is to say, the central or main ribs of each group, by reason of their relatively large cross section and because of their inclined relation to the channels for the heavy outside or marginal frame members into which the molten metal is initially poured, provide channels or passages in the mold which, even in the case of thin and relatively light grid structures, will permit the molten metal to quickly flow through all parts of the mold before becoming chilled and will amply supply the relatively small intermediate passages in which the auxiliary ribs are cast. Owing to such construction and arrangement of the grid parts therefore, the necessary free and certain flow of molten metal is obtained at lower temperatures of both mold and molten metal than would be the case with any other arrangement of equivalent channels with which I am familiar and as a consequence, the metal of the finished grid undergoes less shrinkage and therefore is relatively sound and strong.

As a result of the above described truss construction and arrangement of ribs and frame as well as of the sounder character of metal resulting from the comparatively low casting temperature, the finished electrode or plate employing my grid possesses structural strength and permanence materially greater than that of other plates of the same general type having grids of any prior design, both against internal expansive stresses and against external stresses resulting from vibration, shock, bending or compression. Owing to this increase in structural strength and to the elimination of the usual heavy vertical members within and parallel with the side members of the frame of the grid, it is possible to materially reduce the combined cross section, or volume, of the various frame and rib elements and hence the amount of metal in a grid having the same over all dimensions as similar prior grids.

In that form of my invention shown in Figs. 5 to 7 I have provided main and auxiliary ribs inclined to the side and end members of the rectangular marginal frame which incloses them, and dispose the main ribs 10 in two parallel sets each of a thickness substantially half of that of the frame and the same as the auxiliary ribs 11 whose cross section is materially less than that of said main ribs. The main ribs of each set are arranged in two series of which those of each series are parallel and intersect or cross those of the other series. Moreover, the spacing of the main ribs is such that any two adjacent parallel main ribs of one series have between them a main rib of the other set.

The auxiliary ribs are so disposed that between the main rib of one set and the adjacent parallel main rib of the other set are two parallel auxiliary ribs 11, one in each of the two parallel planes including the main ribs. The distance between the centers of these two ribs as well as that between each of them and the adjacent main rib is substantially the same, and in the case illustrated any one of them is twice as far from the main rib in its own plane as from the main rib in the parallel plane.

As in the other form of my invention, the main ribs by reason of their relatively large cross section and inclined relation to the heavy marginal frame members into which the molten metal is initially poured, provide channels in the mold which insure a quick, uniform and ample flow of molten metal to all parts of the mold, and particularly to the channels defining the thinner auxiliary ribs, at relatively low temperatures of mold and molten metal.

I claim:

1. A grid having a marginal frame; with two sets of ribs lying respectively in parallel planes and inclosed by said frame, each of said sets consisting of a number of groups of parallel ribs of which adjacent groups are separated by spaces greater than the distance between the ribs comprising them and are intersected by a series of ribs extending in lines running at other than at an angle of 90° to the elements of the marginal frame.

2. A grid having a marginal frame; with two sets of ribs lying respectively in parallel planes and inclosed by said frame, each of said sets consisting of a number of groups of parallel ribs of which adjacent groups are separated by spaces greater than the distance between the ribs comprising them and are intersected by a series of equally spaced ribs.

3. A grid having a marginal frame; with two sets of ribs lying respectively in parallel planes and inclosed by said frame, each of said sets consisting of a number of groups of parallel ribs of which adjacent groups are separated by spaces greater than the distance between the ribs comprising them and are intersected by a series of ribs, of which certain extend through the grid and serve as part of the ribs of the other set.

4. A grid consisting of a marginal frame; two sets of ribs lying in parallel planes and extending in lines inclined to the members of said frame, the ribs in one set running in lines at an angle to those of the other set and being arranged in groups consisting of main and auxiliary ribs, the main ribs having approximately twice the thickness of the auxiliary ribs; with two other sets of parallel auxiliary ribs lying in said planes respectively and each running across the groups of ribs in its plane.

5. The combination in a grid of a rectangular frame; two series of straight main ribs intersecting one another and having substantially the thickness of said frame and inclined to the side and end elements of said frame; with auxiliary ribs of less thickness than the main ribs extending between the same.

6. The combination in a grid of a rectangular frame; two series of main ribs intersecting one another and having substantially the thickness of said frame and inclined to the side and end elements of said frame; with two sets of intersecting auxiliary ribs each of less thickness than the main ribs and connecting the same in two parallel planes.

7. The combination in a storage battery grid of a rectangular marginal frame; intersecting main ribs of substantially the thickness of the frame and extending in lines inclined to the side and end members thereof; with two sets of auxiliary ribs lying in parallel planes of which those in each plane consist of two intersecting series, the auxiliary ribs of one series in each plane extending midway between and alternating with certain of the main ribs and the auxiliary ribs of the other series in each plane extending in pairs respectively parallel with and immediately adjacent the others of the main ribs on opposite sides thereof.

8. A grid having a marginal frame; main ribs inclined to the side elements of said frame; with intersecting auxiliary ribs of less section than the main ribs and extending between the same.

9. A grid having a marginal frame; main ribs therein; with intersecting auxiliary ribs of less section than the main ribs and of a thickness substantially half that of the frame, said auxiliary ribs extending between said main ribs.

10. A grid having a marginal frame; two sets of main ribs therein; and two sets of auxiliary ribs of less section than the main ribs and extending between the same, the main and auxiliary ribs of one set being respectively staggered relatively to those of the other set.

11. A grid having a marginal frame; two sets of intersecting main ribs each having a thickness substantially equal to half that of the frame; two sets of intersecting auxiliary ribs extending between the main ribs respectively and also each of a thickness substantially half that of the frame, the intersections of the ribs of one set lying substantially opposite the centers of the figures defined by the intersecting ribs of the other set.

In witness whereof I affix my signature.

WALTER E. HOLLAND.